United States Patent
Yu

(10) Patent No.: US 12,308,553 B2
(45) Date of Patent: May 20, 2025

(54) CONNECTOR MODULE

(71) Applicant: LG Energy Solution, Ltd., Seoul (KR)

(72) Inventor: Seon-Uk Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 356 days.

(21) Appl. No.: 17/783,348

(22) PCT Filed: Mar. 24, 2021

(86) PCT No.: PCT/KR2021/003631
§ 371 (c)(1),
(2) Date: Jun. 8, 2022

(87) PCT Pub. No.: WO2021/225275
PCT Pub. Date: Nov. 11, 2021

(65) Prior Publication Data
US 2023/0009193 A1    Jan. 12, 2023

(30) Foreign Application Priority Data

May 4, 2020 (KR) .................... 10-2020-0053358

(51) Int. Cl.
*H01R 13/46* (2006.01)
*H01R 13/66* (2006.01)

(52) U.S. Cl.
CPC ....... *H01R 13/465* (2013.01); *H01R 13/6683* (2013.01)

(58) Field of Classification Search
CPC .......................... H01R 13/465; H01R 13/6683
USPC ...................................................... 439/489
See application file for complete search history.

(56) References Cited

U.S. PATENT DOCUMENTS

| 5,112,246 | A | * | 5/1992 | Kawase ............... H01R 13/629 |
| | | | | 439/489 |
| 6,389,903 | B1 | * | 5/2002 | Oba ................... H01R 13/6683 |
| | | | | 73/756 |
| 7,090,531 | B2 | | 8/2006 | Simmel |
| 10,627,301 | B2 | | 4/2020 | Monichino et al. |

(Continued)

FOREIGN PATENT DOCUMENTS

| CN | 106093694 A | 11/2016 |
| CN | 205723729 U | 11/2016 |

(Continued)

OTHER PUBLICATIONS

International Search Report for Application No. PCT/KR2021/003631 dated Jul. 16, 2021, 2 pgs.

(Continued)

*Primary Examiner* — Gary F Paumen
(74) *Attorney, Agent, or Firm* — Lerner David LLP

(57) ABSTRACT

A connector module, which includes a male connector having a first housing and first terminals accommodated in the first housing; a female connector having a second housing configured such that the first housing is fitted therein and second terminals accommodated in the second housing, and a connector connection detecting unit having a pressure sensor configured to contact at least one side of the first housing when the first housing is entirely fitted into the second housing, the connector connection detecting unit being configured to transmit a connection state of the male connector and the female connector to an external device.

11 Claims, 4 Drawing Sheets

(56) References Cited

U.S. PATENT DOCUMENTS

| | | |
|---|---|---|
| 2004/0105325 A1 | 6/2004 | Sago et al. |
| 2014/0187078 A1* | 7/2014 | Zhou .................. H01R 13/6683 |
| | | 439/489 |
| 2017/0308495 A1 | 10/2017 | Morrison et al. |
| 2018/0090868 A1* | 3/2018 | Forwerck ............. H01R 13/405 |
| 2018/0113042 A1* | 4/2018 | Monichino ......... G01L 19/0076 |
| 2018/0145448 A1 | 5/2018 | Munch |
| 2019/0310428 A1 | 10/2019 | Takeuchi et al. |
| 2020/0176826 A1 | 6/2020 | Yun et al. |

FOREIGN PATENT DOCUMENTS

| | | |
|---|---|---|
| CN | 207782049 U | 8/2018 |
| JP | H0628808 U | 4/1994 |
| JP | 2004165088 A | 6/2004 |
| JP | 2005-242476 A | 9/2005 |
| JP | 2008108630 A | 5/2008 |
| JP | 2012174619 A | 9/2012 |
| JP | 2014032749 A | 2/2014 |
| JP | 2018525663 A | 9/2018 |
| KR | 20100011451 U | 11/2010 |
| KR | 101869055 B1 | 6/2018 |
| KR | 20190098530 A | 8/2019 |
| WO | 2015065432 A1 | 5/2015 |
| WO | 2016185957 A1 | 11/2016 |
| WO | 2018148089 A1 | 8/2018 |

OTHER PUBLICATIONS

Extended European Search Report including Written Opinion for Application No. 21799631.3 dated May 23, 2023, pp. 1-8.

* cited by examiner

CONNECTOR MODULE

CROSS-REFERENCE TO RELATED APPLICATIONS

The present application is a national phase entry under 35 U.S.C. § 371 of International Application No. PCT/KR2021/003631 filed Mar. 24, 2021, which claims priority from Korean Patent Application No. 10-2020-0053358 filed May 4, 2020, all of which are incorporated herein by reference.

TECHNICAL FIELD

The present disclosure relates to a connector module, and more particularly, to a connector module capable of figuring out a correct connection state of a connector, which is provided inside a battery pack and thus cannot be identified by naked eyes, in real time.

BACKGROUND ART

Various electric devices including TVs, monitors, laptops, smart phones and battery packs transmit and receive data between components or between circuit boards by using signal transmission means such as signal cables, flexible printed circuit boards (FPCBs) and flat flexible cables (FFCs). A connector is a connecting device that makes it easy to connect the signal cable, the FPCB, the FFC, or the like to the components or the circuit boards, and the connector is an accessory component that is essentially included in an electrical product that transmit and receive data by wire.

Generally, the connector includes a female connector and a male connector in a pair, and is configured in a receptacle manner or plug-in manner.

For example, the female connector includes a housing of the female connector and a plurality of female connector pins corresponding to contacts, and the male connector may be configured to include a housing of the male connector, which may be inserted into the housing of the female connector, and a plurality of male connector terminals capable of being connected to the plurality of female connector pins in a plug-in manner.

One of the female connector and the male connector, for example the female connector, is surface-mounted to a circuit board (Surface Mounter Technology (SMT)), and the male connector is inserted and fixed into the female connector. Electrical signals may be transmitted to the circuit board when the male connector is properly fitted to the female connector so that the male connector terminals and female connector pins are in contact.

Meanwhile, if the connection state of the connector is not correct due to various factors, the corresponding electric device may not operate properly since signal transmission is impossible. However, in most cases, the connector is located inside the electrical device. For example, even in a battery pack, wires and connectors are connected to a BMS circuit board to measure voltage and temperature of battery cells, but after internal components are packaged in the pack case, it is impossible to check the connection state of the connector by naked eyes. In this case, it is possible to check the presence or absence of a digital signal by turning on or off the power, but the physical connection state of the connector cannot be accurately figured out until the pack case is removed.

For example, the electric connection of the terminals may be maintained until just before the connector is completely disconnected. However, in a state where the connector is incompletely connected, the connector may be disconnected even with a small shock or vibration, which may cause a problem.

In addition, even if there is no problem in the connection state of the actual connector, if a signal is not received when the power is turned on, it is difficult to easily determine whether the connection state of the connector has a problem or another device has a problem.

Accordingly, a method for detecting a correct connection state of the connector in real time is required, separate from the power on-off method.

SUMMARY

Technical Problem

The present disclosure is directed to providing a connector module, which may detect a correct connection state of a connector in real time, separate from an existing on-off method.

The technical object of the present disclosure is not limited to the above, and other technical objects not mentioned herein will be clearly understood by those skilled in the art from the following description.

Technical Solution

In one aspect of the present disclosure, there is provided a connector module, comprising: a male connector having a first housing and a plurality of first terminals accommodated in the first housing; a female connector having a second housing configured to receive the first housing therein and a plurality of second terminals accommodated in the second housing; and a connector connection detector having a pressure sensor configured to contact at least one side of the first housing when the first housing is entirely fitted into the second housing, the connector connection detector being configured to transmit a connection state of the male connector and the female connector to an external device based on an output of the pressure sensor.

The second housing may include a rear plate through which the second terminals pass, the pressure sensor being attached to the rear plate inside the second housing, and the first housing may be configured such that a front end of the first housing contacts the pressure sensor when the first housing is entirely fitted into the second housing.

The pressure sensor may be ring shaped and be circumferentially disposed at an edge of the rear plate of the second housing.

The connector connection detector may include a controller positioned outside of the second housing and configured to transmit the connection state to the external device; and a cable configured to connect the pressure sensor to the controller.

The pressure sensor may be a piezo-resistive sensor or a Force Sensitive Resistor (FSR).

The male connector may include a latch member formed integrally with the first housing and configured to hook to the second housing when the first housing is entirely fitted into the second housing, and the second housing may have a groove configured to receive a tip end of the latch member, the pressure sensor being disposed in the groove.

The latch member may include a horizontal plate configured to extend above the first housing in a first direction that the first housing is configured to be inserted into the second housing; and a latch extending in a second direction other than the first direction from an end of the horizontal plate and configured to be partially inserted into the groove to contact the pressure sensor.

The second housing may further include a protrusion protruding from an upper plate of the second housing such that the first housing is prevented from moving in a direction opposite to the first direction, the second housing being configured to contact a first side of the latch.

The male connector may further include a dummy plug configured to protrude in a lateral direction from a rear end of the first housing, and the female connector may further include a socket positioned at an outer surface of the second housing and configured to receive the dummy plug, the pressure sensor being positioned in the socket.

The dummy plug may be configured to contact the pressure sensor when the first housing is entirely fitted into the second housing.

In another aspect of the present disclosure, there is also provided a battery pack, comprising the connector module described in any of the embodiments described herein.

Advantageous Effects

According to an embodiment of the present disclosure, it is possible to provide a connector module, which may detect a correct connection state of a connector in real time, separate from an existing on-off method.

More specifically, the connector module according to the present disclosure may always check a correct connection state of the connector by detecting a pressure change applied by the male connector with a pressure sensor when the female connector and the male connector are fully fitted, and transmitting the pressure change signal to an external device.

Those skilled in the art will clearly understand from the following description that various technical objects not mentioned herein can be solved from embodiments according to the present disclosure.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

A connector module 10 according to the present disclosure described below is a component of a battery pack and may be applied to connect a signal wire, a flexible cable, or the like to a BMS circuit board in order to measure voltage and temperature of battery cells. Here, the connector module 10 is not limited to a component of a battery pack. For example, the connector module 10 may be applied to an electronic device such as a TV, a refrigerator, a washing machine, a computer and an audio devices, or other machines, appliances and devices requiring signal transmission.

Figure 1:
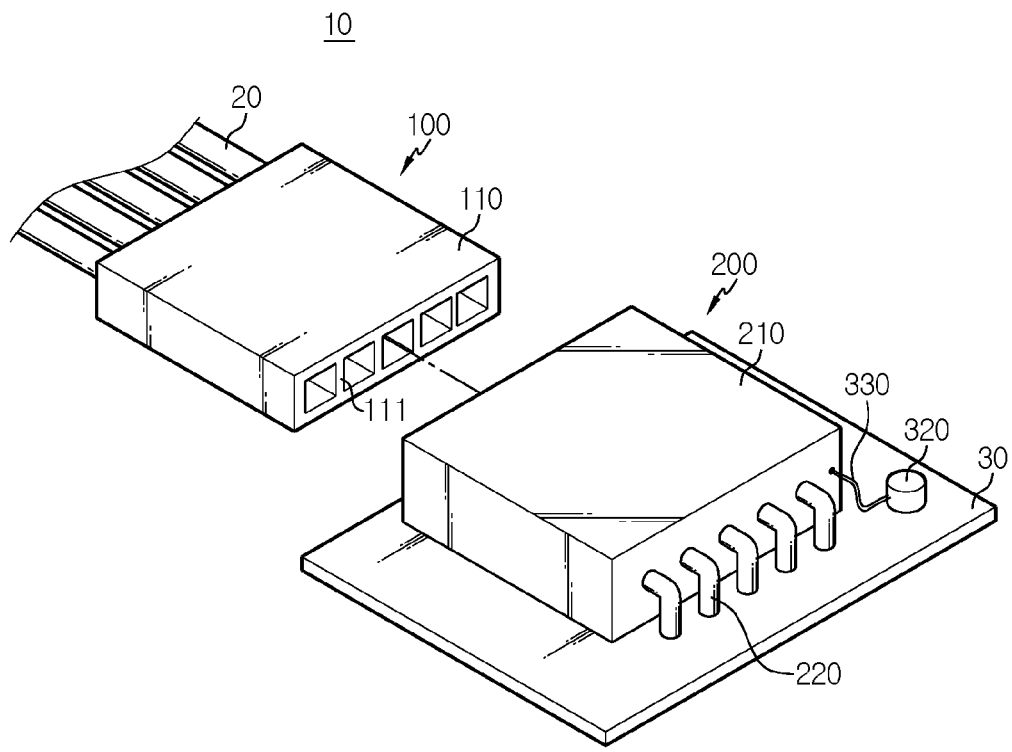
FIG. 1 is a perspective view schematically showing a configuration of a connector module according to an embodiment of the present disclosure.
Figure 2:
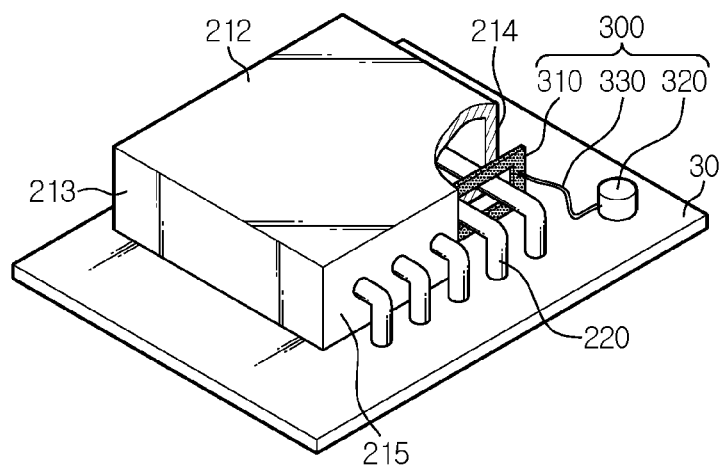
FIG. 2 is a partially sectioned perspective view showing a female connector of FIG. 1.
Figure 3:
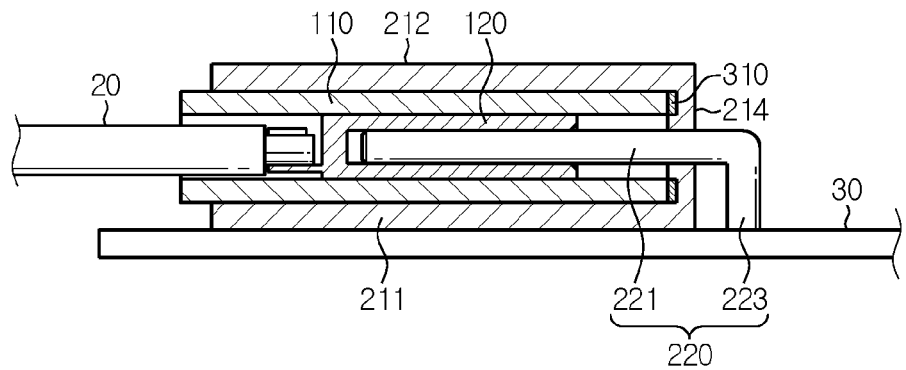
FIG. 3 is a sectional view schematically showing a state where a male connector and a female connector are connected correctly according to an embodiment of the present disclosure.
Figure 4:
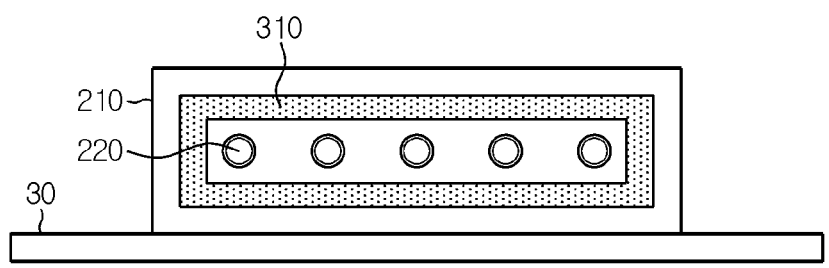
FIG. 4 is a front view showing the female connector of FIG. 2.

FIG. 1 is a perspective view schematically showing a configuration of a connector module according to an embodiment of the present disclosure, FIG. 2 is a partially sectioned perspective view showing a female connector of FIG. 1, FIG. 3 is a sectional view schematically showing a state where a male connector and a female connector are connected correctly according to an embodiment of the present disclosure, and FIG. 4 is a front view showing the female connector of FIG. 2.

Referring to these drawings, the connector module 10 according to an embodiment of the present disclosure may include a male connector 100, a female connector 200 and a connector connection detecting unit 300.

The male connector 100 according to this embodiment may be mounted to one end of signal cables 20. The male connector 100 and the signal cables 20 may be connected to each other by compressing or welding core wires of the signal cables 20 to first terminals 120 provided to the male connector 100.

The female connector 200 may be mounted to one side of a printed circuit board 30. Although not shown in detail for the convenience of the drawing, the female connector 200 may be mounted to the printed circuit board 30 with a hook or bolt, and second terminals 220 of the female connector 200 may be soldered to a conductor pattern (not shown) provided on the printed circuit board 30. The conductor pattern may be configured to be connected to a BMS chip (application-specific integrated circuit (ASIC), not shown) mounted on the printed circuit board 30.

If the male connector 100 is fitted into the female connector 200, the first terminals 120 and the second terminals 220 come into contact to be electrically connected, and accordingly, an electric signal of the signal cable 20 may be transmitted through the connector module 10 to the BMS chip on the printed circuit board 30.

At this time, the electric signal may be stably transmitted only when the male connector 100 and the female connector 200 are properly connected, so it is necessary to constantly monitor the connection state of the connector.

In particular, if the connector module 10 is used as a component of a battery pack for a vehicle, since the connector module 10 may be exposed to an environment continuously subjected to vibration and shock, it is more required to detect the connection state in real time.

To this end, the connector module 10 according to the present disclosure includes the connector connection detecting unit 300, so that when the male connector 100 is inserted into the female connector 200, it is possible to know a correct connection state of the connector in real time by detecting a change in pressure applied by the male connector 100 even in an environment where the connection state cannot be checked with naked eyes. Hereinafter, main components of the connector module 10 will be described in more detail.

Referring to FIGS. 1 and 3, the male connector 100 includes a first housing 110 and first terminals 120 accommodated in the first housing 110.

The first housing 110 is a structure provided to protect the first terminals 120 from external impact and to connect and fix the first terminals 120 to the female connector 200, which is a counterpart. The first housing 110 may be prepared, for example, by plastic injection molding.

Specifically, the first housing 110 according to this embodiment has an approximately rectangular box shape and may be configured to have an inner space in which the first terminals 120 may be disposed and a plurality of partitions 111 for partitioning the inner space. The partitions 111 may be provided at regular intervals in the width direction of the first housing 110, and electrical insulation between the first terminals 120 may be secured by disposing the first terminals 120 one by one in each space between the partitions 111.

In addition, as the first terminals 120 are disposed in the inner space defined by the partitions 111, it is possible to secure the fixation of each of the first terminals 120 and accurately and safely guide the connection with the female connector 200.

For reference, in this embodiment, the first housing 110 is simply implemented in a square box shape, but the first housing 110 may further include a fixing structure such as a hook that may be fastened to an outer surface of the female connector 200.

The first terminal 120 is a connection terminal for transmitting an electrical signal and may be made of a metal material such as copper or aluminum.

Specifically, the first terminal 120 of this embodiment may have one end provided to surround and compress the core wire of the signal cable 20 and an approximately U-shaped contact portion provided to extend in two directions from the one end and have some elasticity. The second terminal 220, explained later, may be connected to the contact portion.

The first terminal 120 may be provided in plural as many as the number of signal cables 20. For example, in this embodiment, since five signal cables 20 are provided, the number of corresponding first terminals 120 is also five. That is, the number and arrangement of the first terminals 120 may vary as desired according to the number and arrangement of the signal cables 20. For example, if ten signal cables 20 are provided, in the male connector 100, ten first terminals 120 may be provided in a layered form such that five first terminals 120 are arranged in each layer inside the first housing 110.

Referring to FIGS. 1 to 4 again, the female connector 200 includes a second housing 210 and second terminals 220 accommodated in the second housing 210.

The second housing 210 may be configured to protect the second terminals 220 and be fitted into the first housing 110. The second housing 210 may be made by injection molding using a plastic material with insulation and may be mounted on the printed circuit board 30 with a hook or bolt (not shown).

The second housing 210 according to this embodiment may be configured in an approximately rectangular box shape with an inner space into which the first housing 110 may be inserted. More specifically, the second housing 210 has an opening corresponding to an entrance, a lower plate 211 placed on the printed circuit board 30, an upper plate 212 facing the lower plate 211, a left plate 213 and a right plate 214 forming both sides of the second housing 210, and a rear plate 215 facing the opening. The inner space of the second housing 210 may be defined as the space enclosed by the lower plate 211, the upper plate 212, the left plate 213, the right plate 214 and the rear plate 215. The rear plate 215 may further have perforated holes to allow the second terminals 220 to pass therethrough.

For reference, in this embodiment, the second housing 210 is simplified as an approximately rectangular box shape, but this is an example for forming the inner space. That is, the second housing 210 may also be configured to have a polygonal shape or to have a curve or a step, unlike this embodiment.

Like the first terminal 120 described above, the second terminal 220 is a connection terminal for transmitting an electrical signal and may be made of a metal material such as copper and aluminum.

As shown in FIG. 3, the second terminal 220 includes an inner part 221 disposed inside the second housing 210 and an outer part 223 disposed outside the second housing 210 and may be coupled to the second housing 210 to pass through the second housing 210.

Specifically, the inner part 221 may be provided in a straight form toward the opening from the rear plate 215 so as to be connected to the U-shaped contact portion of the first terminal 120 in a plug-in manner. In addition, after the inner part 221 is connected to the first terminal 120, the close contact between the inner part 221 and the first terminal 120 may be maintained by the elasticity of the first terminal 120.

The outer part 223 is a part for soldering to the land part of the printed circuit board 30, and may be configured to be bent and extend toward the lower plate 211 outside the rear plate 215.

Meanwhile, the connector connection detecting unit 300 is a component for detecting a correct connection state between the male connector 100 and the female connector 200, and may include a pressure sensor 310, a controller 320, and a cable 330 for connecting the pressure sensor 310 and the controller 320.

The pressure sensor 310 may contact at least one side of the first housing 110 when the first housing 110 is inserted into the second housing 210 to a predetermined depth and thus entirely fitted therein.

As shown in FIGS. 2 and 4, the pressure sensor 310 according to this embodiment may be disposed inside the second housing 210 in a state of being attached to the inner surface of the rear plate 215 of the second housing 210. For example, the pressure sensor 310 is provided in a rectangular ring shape and disposed at an inner edge of the rear plate 215 of the second housing 210 along a circumferential direction. A front end (distal end) of the first housing 110 comes into contact with this pressure sensor 310.

That is, as shown in FIG. 3, when the first housing 110 is entirely fitted into the second housing 210, the front end of the first housing 110 comes into contact with the pressure sensor 310 having a rectangular ring shape.

According to the configuration of the pressure sensor 310, if the first housing 110 is not fully inserted into the second housing 210 from the beginning to come into an incomplete connection state or if the connector is fastened normally but the first housing 110 is partially removed from the second housing 210 by receiving shock or vibration, the pressure of the male connector 100 is not detected by the pressure sensor 310. At this time, if normal pressure is not detected through the pressure sensor 310, it may be considered that the connection of the connector is bad. For reference, if normal pressure is detected through the pressure sensor 310 but there is no signal from the signal cable 20, this may mean that there is a problem with the signal cable or other parts, not with a bad connection of the connector.

As the pressure sensor 310, a piezo-resistive sensor may be employed. For reference, the piezo-resistive sensor is a kind of pressure sensor 310 that converts pressure to voltage and outputs an electric signal by using that the resistance value of a strain gauge changes in proportion to pressure when pressure is applied. Here, the scope of the present disclosure is not limited to the piezo-resistive sensor. For example, the piezo-resistive sensor may be replaced with another type of pressure sensor such as a FSR (Force Sensitive Resistor) pressure sensor that may be manufactured in the form of a thin film.

The controller 320 may be configured to diagnose a connection state of the male connector 100 and the female connector 200 based on a value output from the pressure sensor 310 and take charge of transmitting the same to an external device (not shown). Here, the external device may be any kind of device capable of receiving a wireless signal, such as a smart phone, a digital computer, or an electronic control unit (ECU) of a vehicle.

The controller 320 may include a wireless transceiver and a battery for supplying power to the pressure sensor 310 and the wireless transceiver, and may be connected to the pressure sensor 310 with a cable 330 and disposed outside the second housing 210. In this case, the pressure sensor 310 may be easily interposed in the second housing 210 in a compact form, and it is possible to avoid signal noise or crosstalk with the first and second terminals 220.

In particular, the controller 320 according to the present disclosure is driven by its own power source, separately from a main power supplied to the signal cable 20 and the printed circuit board 30. Thus, the controller 320 may include a battery in itself, and the wireless transceiver and the pressure sensor 310 may be driven by the battery. In this case, the connection state of the connector may be always detected through the pressure sensor 310, separately from the on-off operation of the main power.

According to the configuration and operation of the connector module 10 as described above, it is possible to detect the connection state of the connector even when the connector module 10 is in a place that cannot be checked with naked eyes. In addition, a conventional connector that checks a connection state of a connector according to the presence or absence of an electric signal by turning on/off a system power has a problem that a correct connection state of the connector cannot be accurately known before the female/male connectors 100, 200 are completely separated, and also, if the electric signal is not detected in a state where the system power is turned on, it is not possible to accurately determine whether this is caused by a bad connection state of the connector or not. However, it is possible to solve this problem by using to the connector module 10.

Figure 5:
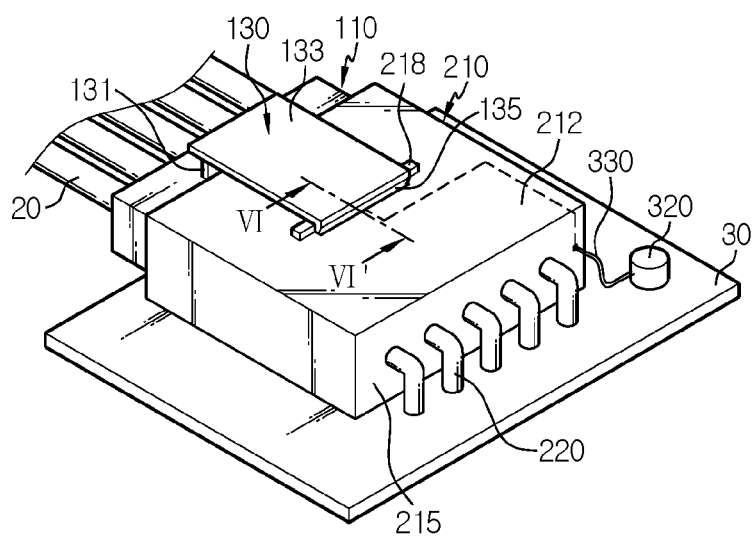
FIG. 5 is a perspective view schematically showing a connector module according to another embodiment of the present disclosure.
Figure 6:
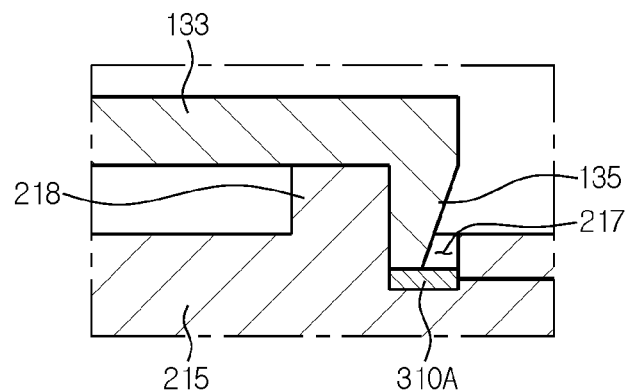
FIG. 6 is a partially sectioned showing the connector module, taken along the line VI-VI' of FIG. 5.

FIG. 5 is a perspective view schematically showing a connector module 10 according to another embodiment of the present disclosure, and FIG. 6 is a partially sectioned showing the connector module 10, taken along the line VI-VI' of FIG. 5.

Next, another embodiment of the present disclosure will be described with reference to the FIGS. 5 and 6. The same reference signs as those in the former embodiment denote the same components, and only features different from the former embodiment will be described in detail, without describing the same components again.

The male connector 100 according to another embodiment of the present disclosure further includes a latch member 130 integrally formed with the first housing 110 and coupled to the second housing 210 by hooking, and the second housing 210 further includes is a hooking groove 217 provided such that a tip end of the latch member 130 may be inserted therein. Also, the pressure sensor 310A may be configured to be interposed in the hooking groove 217.

The latch member 130 may include a horizontal plate 133 extending above the first housing 110 in an inserting direction of the first housing 110, and a latch 135 bent at a tip end of the horizontal plate 133.

As shown in FIG. 5, the horizontal plate 133 is supported by a connection plate 131 protruding upward at an edge of the first housing 110 and is spaced apart by a certain height from the upper surface of the first housing 110, so as to be disposed above the upper plate 212 of the second housing 210 when the first housing 110 is inserted into the second housing 210.

The hooking groove 217 of the second housing 210 is formed concave at the upper plate 212 of the second housing 210. When the first housing 110 is entirely fitted into the second housing 210, the hooking groove 217 may be provided at a location corresponding to the position of the latch 135 of the latch member 130. The pressure sensor 310 may be interposed in the hooking groove 217, and the cable 330 for connecting the pressure sensor 310 and the controller 320 may be embedded in the upper plate 212 and the rear plate 215 of the second housing 210.

In addition, the second housing 210 may further include a hooking protrusion 218 provided to protrude from the upper plate 212. For example, the hooking protrusion 218 may be provided to be stepped from the hooking groove 217 so that the end portion of the latch 135 touches the inner surface of the latch 135 when being inserted into the hooking groove 217. In this way, the hooking protrusion 218 may allow the first housing 110 not to be moved in a direction opposite to the insertion direction.

According to the configuration of the connector module 10 according to another embodiment of the present disclosure, it is possible to determine a correct connection state of the connector according to whether the latch 135 of the latch member 130 is in contact with the pressure sensor 310A in the hooking groove 217 of the second housing 210. That is, as shown in FIGS. 5 and 6, when the first housing 110 is entirely fitted into the second housing 210, the tip end of the latch 135 of the latch member 130 may contact the pressure sensor 310A. The pressure sensor 310A detects the pressure change at this time, and the controller 320 may transmit the connection state of the connector to the external device based on the signal of the pressure sensor 310A.

In this embodiment, there is an advantage in that the pressure sensor 310A may be easily installed compared to the former embodiment, and the latch member 130 may be utilized as a means for detecting pressure as well as be used to fix the male connector 100 to the female connector 200.

Figure 7:
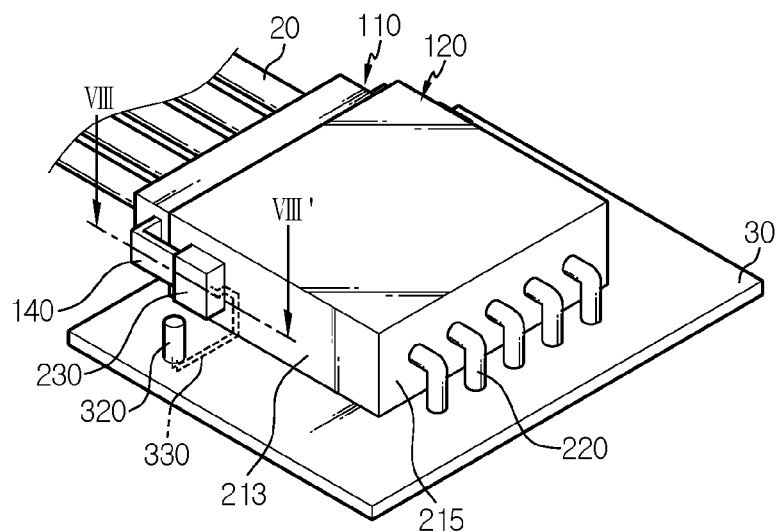
FIG. 7 is a perspective view schematically showing a connector module according to still another embodiment of the present disclosure.
Figure 8:
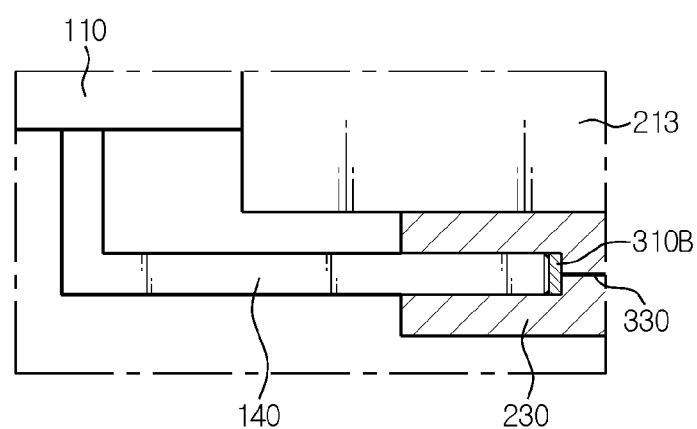
FIG. 8 is a partially sectioned showing the connector module, taken along the line VIII-VIII' of FIG. 7.

FIG. 7 is a perspective view schematically showing a connector module 10 according to still another embodiment of the present disclosure, and FIG. 8 is a partially sectioned showing the connector module 10, taken along the line VIII-VIII' of FIG. 7.

Next, still another embodiment of the present disclosure will be described with reference to FIGS. 7 and 8. The same reference signs as in the former embodiments indicate the same components and will not be described in detail again.

The male connector 100 according to still another embodiment of the present disclosure further includes a dummy plug 140 formed to protrude in a lateral direction from a rear end of the first housing 110. The female connector 200 further includes a sensor mounting portion 230 provided at an outer surface of the second housing 210 and configured in a socket form into which the dummy plug 140 may be inserted, and the pressure sensor 310B may be configured to be interposed in the sensor mounting portion 230.

The dummy plug 140 is integrally formed with the first housing 110 and has an approximately L-shaped cross-section and is spaced apart from the side surface of the first housing 110 by a certain distance. Thus, when the first housing 110 is inserted into the second housing 210, the dummy plug 140 may be disposed parallel to the side plate of the second housing 210 at the outside of the second housing 210. Two dummy plugs 140 may be provided, one at the left surface and one at the right surface of the first housing 110.

The sensor mounting portion 230 has an empty space formed therein into which the dummy plug may be inserted, and the outer shape of the sensor mounting portion 230 may have a block shape. In addition, two sensor mounting portions 230 may be provided, one at the left surface side and one at the right surface side of the second housing 210. The pressure sensor 310B may be interposed at the deepest position in the empty space of the sensor mounting portion 230.

In addition, the dummy plug 140 and the pressure sensor 310B in the sensor mounting portion 230 may be configured and positioned so that the tip end of the dummy plug 140 may contact the pressure sensor 310B when the first housing 110 is entirely fitted into the second housing 210.

According to the configuration of the connector module 10 according to still another embodiment of the present disclosure, it is possible to determine a correct connection state of the connector according to whether the dummy plug 140 is in contact with the pressure sensor 310B in the sensor mounting portion 230. That is, as shown in FIGS. 7 and 8, when the first housing 110 is entirely fitted into the second housing 210, the tip end of the dummy plug 140 may contact the pressure sensor 310B. The pressure sensor 310B detects the pressure change at this time, and the controller 320 may transmit the connection state of the connector to the external device based on the signal of the pressure sensor 310.

In this embodiment, the pressure sensor 310 may be installed more easily compared to the first embodiment. Also, compared to the second embodiment, since the dummy plug 140 is configured to be fitted into the sensor mounting portion 230 in the same direction as the direction along which the first housing 110 is fitted into the second housing 210, it is possible to apply more reliable pressure to the pressure sensor 310. Accordingly, there is an advantage in that the response reliability of the pressure sensor 310 may be improved.

Meanwhile, a battery pack according to the present disclosure may be configured to include the connector module 10 described above, battery cells, a Battery Management System (BMS), and a pack case. For example, the connector module 10 may be used to connect the signal cable 20 or a flat flexible cable (FFC), a flexible printed circuit (FPC), or the like for measuring voltage and temperature of battery cells to the BMS circuit board.

In addition, the battery pack may further include electrical components such as a fuse and a relay as a cooling device for managing temperature of the battery cells and a control device for controlling the flow of current.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A connector module for connecting electrical components of a system configured to operate using a main system power source, the connector module comprising:
    a male connector having a first housing and a plurality of first terminals accommodated in the first housing;
    a female connector having a second housing configured to receive the first housing therein and a plurality of second terminals accommodated in the second housing;
    a connector connection detector including:
        a pressure sensor configured to contact at least one side of the first housing when the first housing is entirely fitted into the second housing; and
        a controller positioned outside of the second housing, the controller including a secondary power source separate from the main system power source, the connector connection detector being configured to transmit a connection state of the male connector and the female connector to an external device based on an output of the pressure sensor using power from the secondary power source and without power from the main system power source.

2. The connector module according to claim 1, wherein the second housing includes a rear plate through which the second terminals pass, the pressure sensor being attached to the rear plate inside the second housing, and
    the first housing is configured such that a front end of the first housing contacts the pressure sensor when the first housing is entirely fitted into the second housing.

3. The connector module according to claim 2, wherein the pressure sensor is ring shaped and is circumferentially disposed at an edge of the rear plate of the second housing.

4. The connector module according to claim 2, wherein the controller is configured to transmit the connection state to the external device; and
    wherein the connector connection detector further includes a cable configured to connect the pressure sensor to the controller.

5. The connector module according to claim 1, wherein the pressure sensor is a piezo-resistive sensor or a Force Sensitive Resistor (FSR).

6. The connector module according to claim 1, wherein the male connector includes a latch member formed integrally with the first housing and configured to hook to the second housing when the first housing is entirely fitted into the second housing, and the second housing includes a groove configured to receive a tip end of the latch member, the pressure sensor being disposed in the groove.

7. The connector module according to claim 6, wherein the latch member includes:

a horizontal plate configured to extend above the first housing in a first direction that the first housing is configured to be inserted into the second housing; and a latch extending in a second direction other than the first direction from an end of the horizontal plate and configured to be partially inserted into the groove to contact the pressure sensor.

8. The connector module according to claim 7, wherein the second housing further includes a protrusion protruding from an upper plate of the second housing such that the first housing is prevented from moving in a direction opposite to the first direction, the second housing being configured to contact a first side of the latch.

9. The connector module according to claim 1, wherein the male connector further includes a dummy plug configured to protrude in a lateral direction from a rear end of the first housing, and the female connector includes a socket positioned at an outer surface of the second housing and configured to receive the dummy plug, the pressure sensor being positioned in the socket.

10. The connector module according to claim 9, wherein the dummy plug is configured to contact the pressure sensor when the first housing is entirely fitted into the second housing.

11. A battery pack, comprising the connector module according to claim 1.

* * * * *